United States Patent [19]

Dzaack

[11] 4,144,761

[45] Mar. 20, 1979

[54] HANDPIPETTE

[75] Inventor: Heinz Dzaack, Munich, Fed. Rep. of Germany

[73] Assignee: LKB-Produkter AB, Bromma, Sweden

[21] Appl. No.: 880,894

[22] Filed: Feb. 24, 1978

[30] Foreign Application Priority Data

Feb. 25, 1977 [SE] Sweden ................................ 7702086

[51] Int. Cl.[2] ................................................ G01N 1/14

[52] U.S. Cl. .............................. 73/425.6; 73/425.4 P; 222/309

[58] Field of Search ......... 73/425.6, 425.4 P, 425.4 R; 222/309; 128/218 A, 218 P, 218 PA

[56] References Cited

U.S. PATENT DOCUMENTS

| | | | |
|---|---|---|---|
| 2,670,881 | 3/1954 | Sjöblom | 222/309 |
| 3,248,950 | 5/1966 | Pursell | 222/309 |
| 3,494,201 | 2/1970 | Roach | 73/425.4 P |
| 3,517,668 | 6/1970 | Brickson | 222/309 |
| 3,881,360 | 5/1975 | Jurado | 73/425.6 |
| 3,933,048 | 1/1976 | Scordato | 73/425.6 |

FOREIGN PATENT DOCUMENTS

| | | | |
|---|---|---|---|
| 1276369 | 8/1968 | Fed. Rep. of Germany | 73/425.6 |

*Primary Examiner*—S. Clement Swisher
*Assistant Examiner*—Denis E. Corr
*Attorney, Agent, or Firm*—George H. Mitchell, Jr.; Arnold B. Christen; Eugene Sabol

[57] ABSTRACT

A pipette having an axially displaceable piston is provided with a transversely displaceable stopping device for limiting the displacement of the piston in accordance with a volumetric scale marked on the stopping device. Operation of the piston and stopping device can be done with one hand.

8 Claims, 6 Drawing Figures

HANDPIPETTE

The present invention refers to a handpipette comprising a piston displaceable in a cylinder into which liquids is sucked, the displacement of the piston being controlled by a distance plate arranged in a pipette casing, the plate being affected by at least one pushbutton.

In handpipetting designs basically two different embodiments are used, one having a fixed setting of the desired volumes and the other one having the possibility of setting different volumes by means of a displaceable setting means, e.g. a micrometer screw.

The mode of operation in such pipettes is in principle the same for the designs known. The piston of the pipette is held in it's initial position by means of a force generated by a spring. If a liquid such as a sample or a similar specimen is to be sucked into the pipette the spring biased piston is first by means of a pushbutton pressed downwards towards a stop. The extension of this displacement corresponds to the desired volume. Thereafter the pushbutton is released whereby the spring is expanded and moves the piston of the pipette upwards for sucking up the liquid.

In order to ensure that no part of the liquid remains in the tip of the pipette when the piston is again brought downwards towards the stop for dispensing the predetermined volume, certain pipettes are designed so as to make it possible to allow dispensing of the liquid with a bigger displacement than the displacement used for sucking up the volume, a so called overshoot. This overshoot is generally achieved by means of an additional spring biased stop which when pressing down the pushbutton marks the initial position for sucking up a predetermined volume, i.e. when dispensing the liquid the pushbutton shall be brought beyond the spring biased initial position so as to obtain a longer stroke when dispensing that with sucking up the fixed volume. Such means do ensure that the complete predetermined volume is sucked up and thereafter dispensed but the design has other disadvantages. The pushing down of the pushbutton beyond the spring biased stop is tiring for the operator and requires a certain feeling for the spring biased position. Such a feeling by the operator is easily lost in a long series of operations and the risk that the operator dilutes incorrect volumes then becomes substantial.

In order to obtain a variable setting of different volumes the majority of designs known use a so called micrometer screw or screw scales. Also pipettes using fixed setting positions e.g. obtained by means of toothscales are known. In all these designs it is however impossible to change the setting of volumes fast and by using only the band which holds the pipette. Especially when using a micrometerscrew the change from one volume to the other is relatively time-consuming and not exactly reproduceable.

It is an object of the present invention to obtain a handpipette by means of which the above mentioned drawbacks are eliminated. The characteristics of the invention will appear from the claims attached to the specification.

The invention will now be described in detail, reference being made to the englosed drawing in which.

Figure 1:
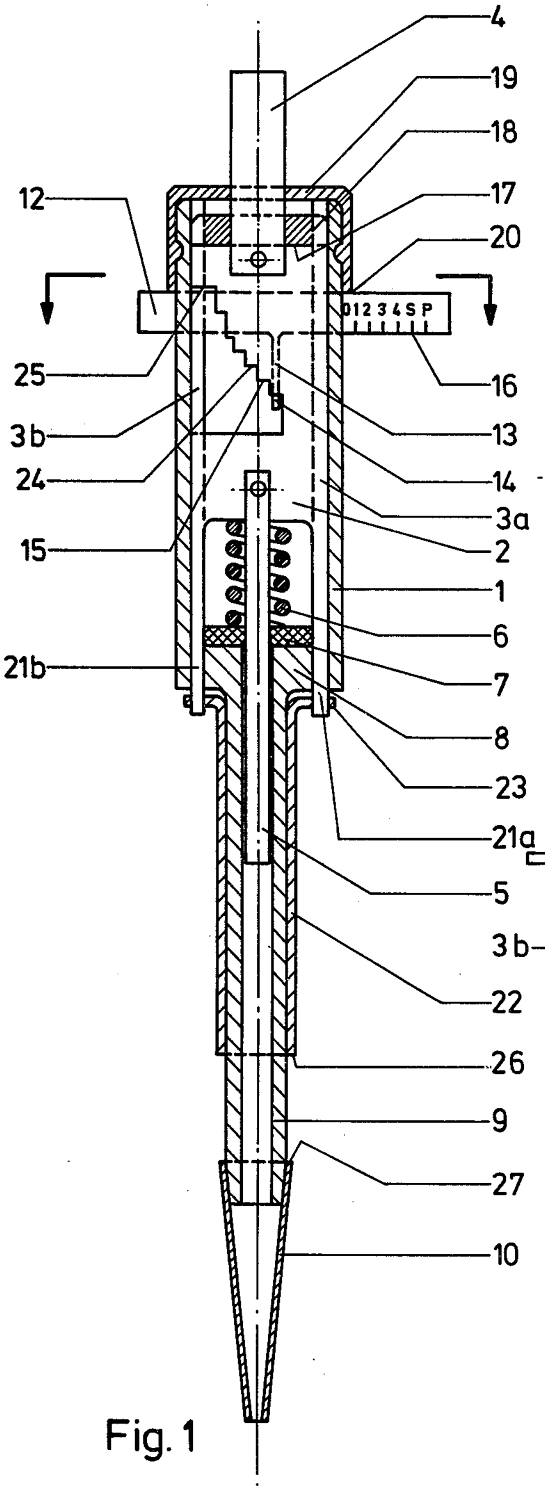
FIG. 1 shows a handpipette according to the invention having a volume setting device which is provided with means for removing the pipette tips.

In FIG. 1 reference 1 denotes a pipette casing in which a distance plate 2 is displaceable journalled for providing the volume setting. The inner wall of the casing is provided with two grooves 3*a*, 3*b* in which the distance plate 2 can be moved upwards and downwards. At the upper part of the distance plate 2 a pushbutton 4 is arranged and at the lower end of the plate a piston 5 is located. The piston 5 is surrounded by a pushspring 6 the upper part of the spring pressing against the lower part of the distance plate 2 and the lower part of the spring pushing against a sealing ring 7 which rests against the bottom 8 of the casing 1. The bottom end of the casing 1 is provided with a pipette tip 10, the upper opening of which is adapted to the tapered part of the cylinder 9.

Figure 3:
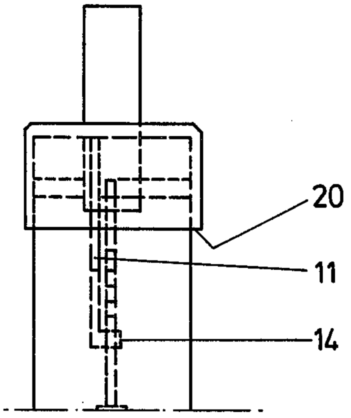
FIG. 3 is a side view of the upper part of the handpipette according to FIG. 1.
Figure 2:
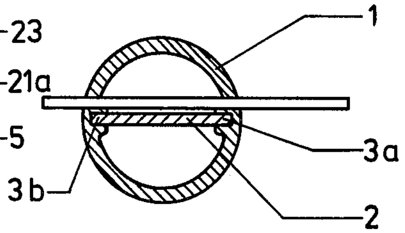
FIG. 2 is a section through the handpipette according to FIG. 1.

A stopping device 12 is arranged in a slot 11 (FIG. 3). The slot 11 runs from the upper edge of the casing 1 in order to facilitate the introduction of the stopping device 12 into the casing. The stopping device 12 is provided with an arm 13 and a stop 14 (FIGS. 1 and 3). The distance plate 2 is provided with a stepped notch 15. The stopping device 12 is provided with a scale 16. As the stopping device is displaced leftwards the scale 16 denotes a certain set volume, that is the distance between each step of the stopping device 12 also determines the distance between the marking of the scale 16. In the initial operating stage the spring 6 presses the distance plate upwards so that its upper edge 17 is pressed against a setting screw 18. This screw 18 is used for adjusting the distance between the bottom step of the distance plate and the stop 14 of the stopping device 12 so as to obtain a desired distance between. After assembly the upper end of the casing 1 is provided with a cover 19 the lower edge 20 of which limits the displacement of the stop device upwards. For removal of the pipette tip the lower part of the distance plate 2 is provided with two extensions 21*a*, 21*b*. The extensions 21*a* and 21*b* run through holes of the bottom 8 of the casing 1 and are provided with a tip remover 22 connected to the extensions via a collar 23.

The device hitherto described operates in the following way. Initially the scale 16 of the stopping device 12 is in the position 0 whereby the stop 14 engages the lowest step of the distance plate 2. For sucking up for instance a volume corresponding to two steps the scale 16 of the stopping device 12 is displaced leftwards until the mark 2 covers the outer wall of the casing. The stop 14 is then in a position exactly under the step 24. The pushbutton is pushed downwards until the step 24 is stopped by the stop 14 of the stopping device 12. Simultaneously the spring 6 has been compressed. The pipette tip is then moved into the liquid. Thereafter the pushbutton 4 is released whereby the spring 6 is expanded and via the piston 5 the liquid is sucked into the pipette tip. The return stroke of the pushbutton 4 and the piston 5 is stopped when the upper end 17 of the distance plate 2 engages the stop 14. Thereby the piston 5 presses the liquid through the pipette tip 10 whereby exactly the same volume which has been sucked up is diluted from the pipette. As appears from this description the handling comprising setting of the desired volume sucking up and diluting of liquid can be performed with one and the same hand whereby the thumb and the fore finger can also perform the displacement of the stopping device 12.

By use of the invention as a so called dispensor, that is for multiple sequential dilutions, a volume of a certain liquid corresponding to e.g. four steps is sucked into the pipette. The diluting is then made according to the following scheme: The stopping device 12 is displaced to mark 1 of the scale. The pushbutton is pushed down until the movement of the distance plate 2 is stopped when the first step reaches the stop 14. Thereby the first volume has been diluted. The pushbutton is thereafter released to the initial position. Thereby a volume of air corresponding to the previously diluted volume of liquid has been sucked into the pipette tip. If another volume of liquid of the same size corresponding to for instance one step shall be diluted the stopping device is moved one mark further leftwards of the scale, that is to scale mark 2. When the pushbutton 4 is pressed down the distance plate 2 will move two steps downwards. Thus first the volume corresponding to one step and thereafter liquid corresponding to another step is diluted. In such a manner different volumes can be diluted sequentially. The number of such volumes will then be dependent of the number of steps which are arranged on a sloping surface in the pipette.

Without changing the shape of the distance plate or the stopping device or other details the pipette according to the invention can be provided with the initially described overshoot movements. According to the invention the overshoot movements could be provided in a very simple manner. Before liquid is diluted the stopping device 12 is moved one or two further steps leftwards. Thereby a bigger movement is obtained. By pushing the pushbutton downwards the distance plate 2 and thereby the piston 5 will be stopped at the engagement of the stop 14 as described above. Thus no additional means are required to provide for the overshoot movement. No erroneous dilutions can take place and the problems with a spring biased overshoot stop is avoided.

By using the handpipette according to the invention it is furthermore possible to provide for a pipette tip removing function in a simple manner without introducing any additional pushbuttons or similar means. By means of the extensions **21*a* and 21*b* of the distance plate the pipette tip can be removed by means of the pipette tip remover 22. Before this removal the stopping device 12 is moved leftwards until the mark P of the scale is covered by the edge of the casing 1. Hereby the stop 14 of the stopping device 12 is located exactly under the highest step 25 of the distance plate. When pressing the pushbutton 4 downwards the distance to the stop 14 is bigger than the distance from the end 26 of the remover 22 to the upper edge 27 of the pipette tip, whereby when the pushbutton is pressed downwards the edge 26 is engages the edge 24 and thus the pipette tip will be removed from the cylinder 9**.

Figure 4:
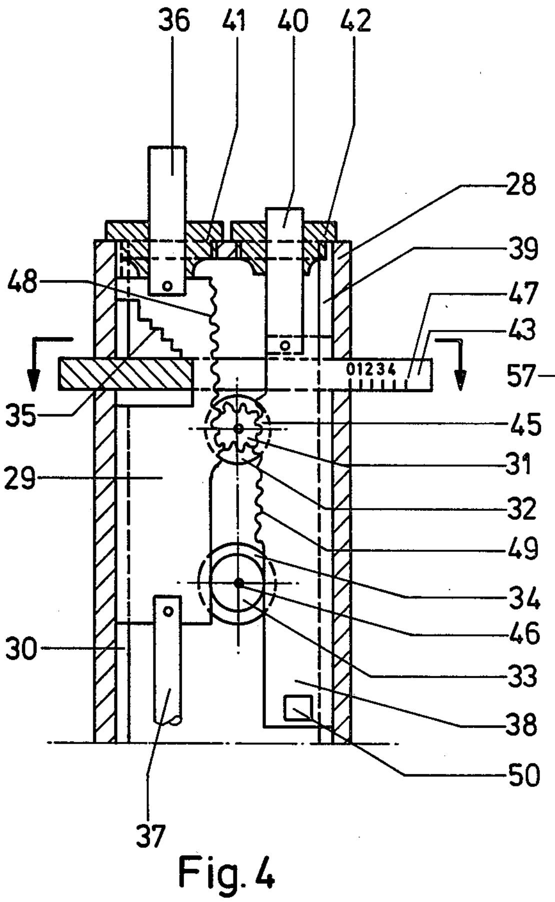
FIG. 4 shows another embodiment of the volume setting device of the handpipette according to the invention.

In FIG. 4 there is shown another embodiment of the pipette according to the invention. In this embodiment sucking up and diluting of liquid could be made by pressing down two different pushbuttons. Thus by using only one hand sucking up, diluting and volume setting or volume change could be made. This is a special advantage for instance when the handpipette is arranged on reagent vessels. In these cases the device could be operated by one hand only and does not necessitate the use of both hands as in the designs known per se when one hand was required to hold the stand or the bottle and the other one was used for the dispensing. This is due to the fact that in the embodiment according to the FIG. 4 both sucking up and diluting is performed by pushing a pushbutton downwards.

In FIG. 4 ref. 28 denotes a pipette casing in which a distance plate 29 is journalled in a guiding groove 30 and between flanges 32 of a gear wheel 31. The gearwheel 31 engages the gears 48 of the distance plate 29. The distance plate 29 is furthermore journalled between the flanges 34 of a wheel 33. The distance plate 29 is provided with stepped notches 35 and is rigidly connected with a pushbutton 36 and a piston rod 37. In the opposite part of the casing 28 a rod 38 is journalled in a guiding groove 39 and between the flanges 32 of the gear wheel 31 and the flanges 34 of the wheel 33. The gear wheel 31 also engages the gears 49 of the rod 38. In the upper part of the rod 38 a pushbutton 40 is arranged. The pushbutton 36 and 40 are each journalled in one screw nut 41 and 42 respectively which are screwed into the casing 28. The stopping device 43 is displaceable in the casing 28 and could be displaces perpendicular to the distance plate 29 and the rod 38 so that both these elements could be moved between the extensions **44*a* and 44*b* of the stopping device 43. The gear wheel 31 and the wheel 33 and each attached to axes 45 and 46 respectively, said axes being journalled in the casing 28. The lower end of the handpipette corresponds to that which is shown in FIG. 1. The system is kept in position by means of friction between the rods and the casing or similar points of friction or by arranging a counterweight 50 on the rod 38**.

The embodiment shown in FIG. 4 operates in the following manner. If a certain volume is to be sucked up the stopping device 43 is moved leftwards towards a desired mark on the scale 47. Thereafter the pushbutton 36 is pushed downwards until the respective step 35 will be stopped by the stopping device 43. During this downwards movement the gears 48 of the distance plate 29 has turned the gear wheel 39 counter clockwise and thereby brought the rod 33 via the gears 49 upwards. The correct volume is now set. When pushing the pushbutton 40 the rod 38 is brought downwards and via the gear wheel 31 the distance plate 29 is brought upwards until it reaches its original position. The correct volume has now been sucked up. When diluting the volume the pushbutton 36 is brought downwards until the respective step 35 is stopped by the stopping device 43. Concerning the overshoot movement, the dispensing of several consecutive volumes etc. the handling of the embodiment of FIG. 4 corresponds to that of FIG. 1.

Figure 6:
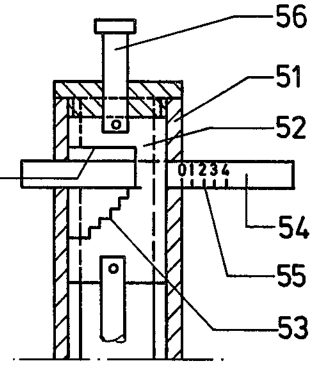
FIG. 6 is a modified embodiment of the handpipette to be used when sucking up accurately determined part volumes of different sample liquids.
Figure 5:
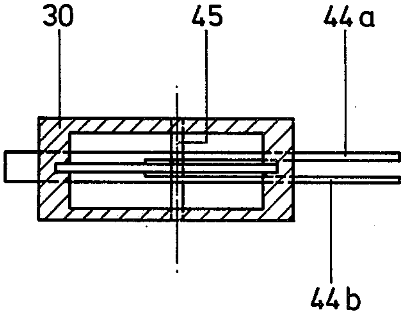
FIG. 5 is a section along the line C—C of the FIG. 4.

The handpipette according to the invention could also be used for sucking up accurately determined part volumes of different sample liquids which are then diluted together with the use of only one operating hand. An embodiment specially designed for this purpose is schematically shown, in FIG. 6. In FIG. 6 numeral 51 denotes a casing in which a distance plate 52 is journalled in accordance with the descriptions of FIG. 1 and 4. A number of steps 53 on the distance plate 52 could from below be engaged by the stopping device 54 which has the same principal design as the corresponding unit of FIG. 4. When setting a mark on the scale 55 the steps of the distance plate 52 will be stopped by the stopping device 54 if the pushbutton 56 is moved upwards. Thus a first sample with its respective volume has been sucked up. The device will remain in this position due to friction forces or balance conditions in according with what has been described in connection to FIG. 4. The next setting of volumes is made by further moving the stopping by the stopping device 54 whereby another volume of for instance another sample liquid has been sucked up. When diluting the liquids the pushbutton 56 is pushed downwards until the inner edge 57 of the distance plate 52 is stopped by the stopping device 54. Thereby the movement of the distance plate 54 in total corresponds to three steps plus an overshoot step. Thereafter the stopping device is moved back to mark 0 of the scale. The distance plate 52 is brought upward via the pushbutton 56 until the 0 step is stopped by the stopping device 54 and thereby the device is in its starting position. It should also be mentioned that certain modifications are possible within the scope of the invention. Thus instead of having stepped notches it would be possible to have some other continuous curve forming the stops and thus admitting continuous instead of discontinuous volume settings. It would also be possible to have a design where the stopping device is moved tangentially instead of axially with respect to the pipette casing.

I claim:

1. A measuring handpipette suitable for one-hand operation comprising a piston axially displaceable in a cylinder into which liquid is sucked, the displacement of the piston being controlled by a measuring means having at least two relatively displaceable elements, one of said two elements being movable with said piston, the other of said two elements being movable with respect to the cylinder between a plurality of predetermined positions by a finger of the hand holding the cylinder, one of said two elements having a stop means, the other of the two elements also having a sloping surface which engages with said stop means at selected locations to adjustably limit movement of the piston in one direction by an amount corresponding to one of the predetermined positions of the first mentioned other element, said piston including a pushbutton projecting outwardly of the cylinder for movement of the piston in said one direction also by a finger of the hand holding the cylinder.

2. A measuring handpipette according to claim 1, wherein said sloping surface is stepped to provide incremental limits of movement.

3. A measuring handpipette according to claim 1, wherein the second mentioned other of said two elements is mounted in the cylinder for reciprocatory movement transverse to the direction of movement of the piston, said second mentioned other element having portions projecting outwardly on opposite sides of the cylinder for respective engagement by a finger of the hand holding the cylinder.

4. A measuring handpipette according to claim 1, wherein a fixed stop is provided to limit movement of the piston in the opposite direction for sucking in a liquid, said liquid being dispensed during movement in said one direction.

5. A measuring handpipette according to claim 1, wherein liquid is sucked in during movement of the piston in said one direction, and a fixed stop is provided to limit movement of the piston in the opposite direction while dispensing liquid.

6. A measuring handpipette according to claim 1, wherein an elongated inlet and discharge tube is provided at one end of said cylinder to removably receive a detachable pipette tip, and a tip remover mounted on said tube is connected to said piston to remove a tip when the piston is fully displaced in a direction to dispense liquid.

7. A measuring handpipette according to claim 1, wherein a second pushbutton is reciprocatorily mounted on said cylinder for operation by a finger of the hand holding the cylinder, said second pushbutton being connected to the piston by motion transmitting means to move the piston in the opposite direction when the second pushbutton is depressed.

8. A measuring handpipette according to claim 7, wherein said pushbuttons are located at one end of the cylinder and said motion transmitting means comprises gear means rotatably mounted in the cylinder to move a respective one of the pushbuttons in the opposite directions when the other pushbutton is depressed.

* * * * *